United States Patent
Lee et al.

(10) Patent No.: US 10,640,684 B2
(45) Date of Patent: May 5, 2020

(54) DOUBLE COATED TAPE EXHIBITING IMPROVED REWORKABLE CAPABILITY

(71) Applicant: 3M INNOVATIVE PROPERTIES COMPANY, St. Paul, MN (US)

(72) Inventors: Ha-Young Lee, Seoul (KR); Do-Kwang Cho, Gyeonggi-do (KR)

(73) Assignee: 3M Innovative Properties Company, St. Paul, MN (US)

( * ) Notice: Subject to any disclaimer, the term of this patent is extended or adjusted under 35 U.S.C. 154(b) by 554 days.

(21) Appl. No.: 15/036,959

(22) PCT Filed: Nov. 25, 2014

(86) PCT No.: PCT/US2014/067204
§ 371 (c)(1),
(2) Date: May 16, 2016

(87) PCT Pub. No.: WO2015/077738
PCT Pub. Date: May 28, 2015

(65) Prior Publication Data
US 2016/0264827 A1  Sep. 15, 2016

(30) Foreign Application Priority Data
Nov. 25, 2013  (KR) .......... 10-2013-0144076

(51) Int. Cl.
*C09J 7/29* (2018.01)
*C09J 7/25* (2018.01)
(Continued)

(52) U.S. Cl.
CPC . *C09J 7/29* (2018.01); *C09J 7/22* (2018.01); *C09J 7/25* (2018.01); *C09J 7/26* (2018.01);
(Continued)

(58) Field of Classification Search
None
See application file for complete search history.

(56) References Cited

U.S. PATENT DOCUMENTS

| | | | |
|---|---|---|---|
| 3,591,402 A | 7/1971 | Blackfan | |
| 3,823,253 A * | 7/1974 | Walters | H01B 7/06 174/113 C |

(Continued)

FOREIGN PATENT DOCUMENTS

| | | | |
|---|---|---|---|
| EP | 0748829 A1 * | 12/1996 | ......... C08G 18/0895 |
| EP | 2 141 211 | 1/2010 | |

(Continued)

OTHER PUBLICATIONS

PCT International Search Report from PCT/US2014/067204, dated Feb. 26, 2015, 3 pages.

*Primary Examiner* — Frank D Ducheneaux
(74) *Attorney, Agent, or Firm* — Steven A. Bern; Philip Y. Dahl (57) ABSTRACT

Provided is a double coated tape with improved reworkable capability, in which a first adhesive layer, a film carrier layer, a foam carrier layer, and a second adhesive layer are sequentially stacked, and which includes a thermoplastic polyurethane (TPU) film located between the foam carrier layer and the second adhesive layer. Since the double coated tape is used for bonding of an LCD panel to a frame, while providing improved light leakage performance and reworkable capability, the double coated tape is advantageously used when manufacturing an electronic appliance such as a television, a cellular phone, and a computer.

12 Claims, 3 Drawing Sheets

(51) Int. Cl.
  *C09J 7/26* (2018.01)
  *C09J 7/22* (2018.01)
  *C09J 133/04* (2006.01)

(52) U.S. Cl.
  CPC ....... *C09J 133/04* (2013.01); *C09J 2201/128* (2013.01); *C09J 2201/162* (2013.01); *C09J 2203/318* (2013.01); *C09J 2203/326* (2013.01); *C09J 2400/243* (2013.01); *C09J 2433/00* (2013.01); *C09J 2467/00* (2013.01); *C09J 2467/006* (2013.01); *C09J 2475/00* (2013.01); *C09J 2475/006* (2013.01)

(56) References Cited

U.S. PATENT DOCUMENTS

| | | | |
|---|---|---|---|
| 5,476,712 A | 12/1995 | Hartman et al. | |
| 5,870,160 A | 2/1999 | Yanagawa et al. | |
| 6,451,398 B1 * | 9/2002 | Sylvester | B29C 44/06 428/41.8 |
| 7,612,863 B2 | 11/2009 | Kim et al. | |
| 7,691,225 B2 | 4/2010 | Kishimoto et al. | |
| 7,821,611 B2 | 10/2010 | Uehara et al. | |
| 2003/0012945 A1 * | 1/2003 | Runge | B41N 6/02 428/317.1 |
| 2003/0134112 A1 | 7/2003 | Kreckel et al. | |
| 2007/0207311 A1 * | 9/2007 | Klauck | A47G 1/17 428/354 |
| 2008/0107887 A1 | 5/2008 | Kim | |
| 2012/0283615 A1 | 11/2012 | Malik et al. | |
| 2013/0034676 A1 | 2/2013 | Casebolt | |
| 2013/0034727 A1 | 2/2013 | Casebolt et al. | |
| 2013/0189507 A1 * | 7/2013 | Yamamoto | C09J 7/21 428/219 |
| 2015/0030797 A1 | 1/2015 | Seo et al. | |

FOREIGN PATENT DOCUMENTS

| | | | |
|---|---|---|---|
| JP | 2007/262322 | 10/2007 | |
| KR | 2009/053042 | 5/2009 | |
| WO | WO-2012112361 A2 * | 8/2012 | ............ C09J 7/0264 |

* cited by examiner

DOUBLE COATED TAPE EXHIBITING IMPROVED REWORKABLE CAPABILITY

CROSS-REFERENCES TO RELATED APPLICATIONS

This application is a national stage filing under 35 U.S.C. 371 of PCT/US2014/067204, filed Nov. 25, 2014, which claims priority to Korean Patent Application 10-2013-0144076, filed Nov. 25, 2013, the disclosures of which are incorporated by reference in their entireties herein.

FIELD

The present invention relates to a double coated tape exhibiting improved reworkability in manufacture of electronic products such as televisions, mobile phones and computers, especially in use for adhesion of a liquid crystal display (LCD) panel.

BACKGROUND

Figure 1:
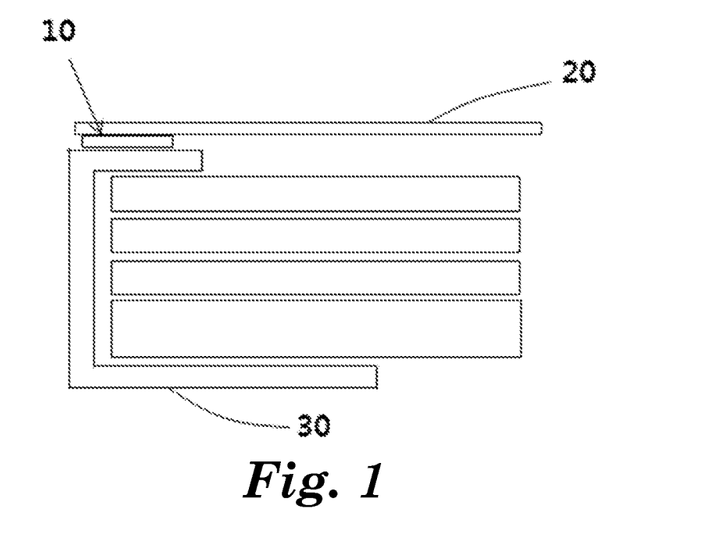
FIG. 1 is a schematic view showing a section of a structure system in which an LCD panel is attached to a guide frame using a double coated tape.

Double coated tapes (or double coated adhesive tapes) have been effectively used for adhesion of component parts during manufacture of electronic products such as televisions, In recent years, performance and quality of such electronic products have increased and products with much thinner bezels are becoming increasingly preferred, thus requiring a double coated tape used to attach a liquid crystal display (LCD) panel to a guide frame to have very strong adhesivity. A cross section of a structure system in which an LCD panel 20 is attached to a guide frame 30 using a double coated tape 10 is shown in FIG. 1.

Figure 2:
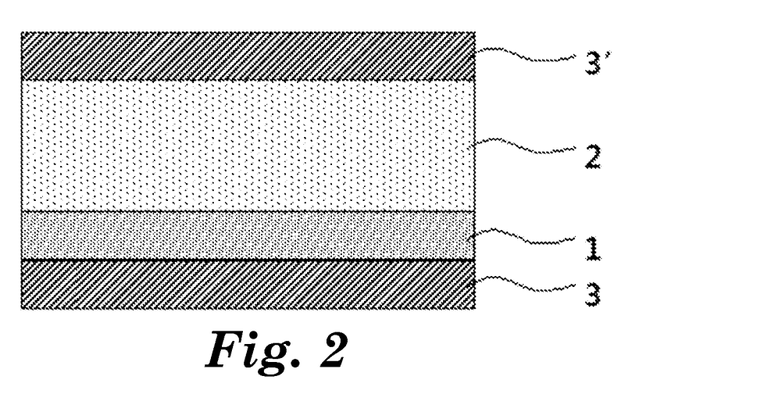
FIG. 2 is a cross-sectional view of a conventional double coated tape including a foam substrate.

Also, when the double coated tape used for attachment of the LCD panel hardens, stress is transferred directly to the LCD and compromising the arrangement of the LCD, thereby causing light leakage (a situation in which an LCD screen becomes splotchy). As a result, double coated tapes including a substrate formed of foam (i.e., a foam carrier) having porosity in addition to a substrate formed of a film (i.e., a film carrier) are currently being used. Since the foam substrate is formed of a soft material rather than a stiff material, a double coated tape including the foam substrate may effectively prevent light leakage in LCD panels. A cross-sectional view of a conventional double coated tape including the foam substrate is shown in FIG. 2. The conventional double coated tape as shown in FIG. 2 includes a composite substrate including a film carrier layer 1 and a foam carrier layer 2, and first and second adhesive layers 3 and 3' formed at both surfaces of the composite substrate, all of which are stacked.

Meanwhile, when defective products formed during a process of manufacturing such an electronic product are discarded, problems including not only resource consumption and environmental pollution but also an increase in economic loss are encountered. Therefore, the defective products should be classified and reused (recycled) according to the constituent elements for the sake of cutting costs for consumers.

In particular, another reason for which LCD panels should be classified and recycled when they are inferior in quality is that they are very expensive. Nevertheless, since an adhesive of the double coated tape has strong adhesive strength and poor foam carrier characteristics, the adhesive of the double coated tape, when removed, is not completely removed cleanly from a surface of the LCD panel, which makes it impossible to reuse (recycle) the LCD panel.

Therefore, many attempts are being made to cleanly remove the adhesive of the attached double coated tape from the surface of the LCD panel including varying the shear strengths to the first adhesive layer and the second adhesive layer disposed at both surfaces of the double coated tape. However, no double coated tapes exhibiting sufficient physical properties to provide reworkability and prevent light leakage have been presented so far.

SUMMARY OF THE INVENTION

The present invention is directed to a double coated tape capable of exhibiting improved reworkability and effectively preventing light leakage, especially when the double coated tape is used to attach a liquid crystal display (LCD) panel during manufacture of electronic products such as televisions, computers and mobile phones.

According to an aspect of the present disclosure, there is provided a double coated tape including a first adhesive layer, a film carrier layer, a foam carrier layer and a second adhesive layer that are sequentially stacked, wherein the double coated tape includes a polyurethane film formed between the foam carrier layer and the second adhesive layer.

According to another aspect of the present disclosure, there is provided an electronic product including the double coated tape.

Effects of the Invention

The double coated tape according to the present disclosure can be useful in providing improved reworkability to expensive LCD panels and effectively preventing light leakage by minimizing stress applied to an LCD since the double coated tape is easily peeled from a surface of an object by means of forces exerted in a vertical direction, an oblique direction and a horizontal direction with respect to an adhesive surface of the double coated tape. Therefore, the double coated tape according to the present invention can be useful in attaching an LCD panel in manufacture of electronic products such as televisions, mobile phones, and computers.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

BRIEF DESCRIPTION OF MAJOR PARTS IN THE DRAWINGS

10: double coated tape
20: liquid crystal display (LCD) panel
30: guide frame
1: film carrier layer
2: foam carrier layer 3: first adhesive layer
3': second adhesive layer
3": third adhesive layer
4: polyurethane film

DETAILED DESCRIPTION

Exemplary embodiments of the present disclosure will be described in detail below with reference to the accompanying drawings. While the present invention is shown and described in connection with exemplary embodiments thereof, it will be apparent to those skilled in the art that various modifications can be made without departing from the scope of the invention.

Unless specifically stated otherwise, all the technical and scientific terms used in this specification have the same meanings as those that are generally understood by a person skilled in the related art to which the present invention belongs. In general, the nomenclatures used in this specification and the experimental methods described below are widely known and generally used in the related art.

The double coated tape according to the present disclosure has a characteristic structure in which a first adhesive layer, a film carrier layer, a foam carrier layer, a polyurethane film and a second adhesive layer are sequentially stacked. The double coated tape may further comprise a third adhesive layer between the film carrier layer and the foam carrier layer. The double coated tape may further comprise a third adhesive layer between the foam carrier layer and the polyurethane film.

When an LCD panel is attached to a guide frame using the double coated tape, the first adhesive layer may come in contact with the guide frame, and the second adhesive layer may come in contact with the LCD panel.

Figure 3:
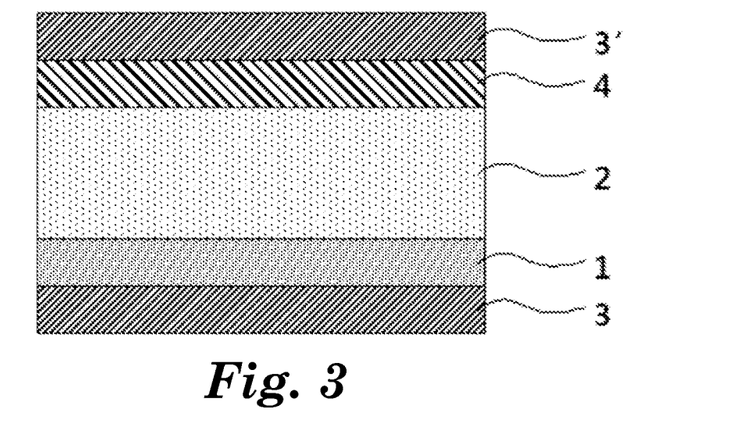
FIGS. 3 to 5 are cross-sectional views of double coated tapes according to various embodiments of the present invention.
Figure 4:
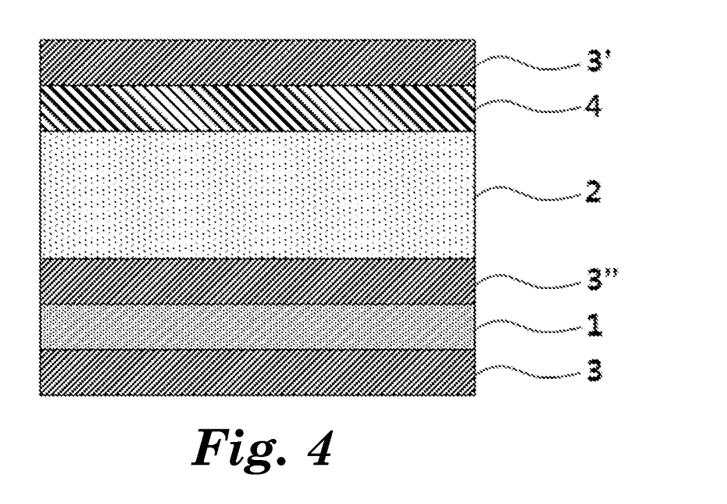
Figure 5:
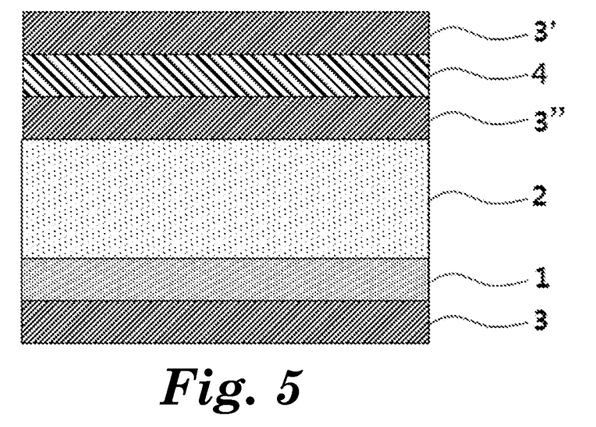

Cross-sectional views of the double coated tapes according to various embodiments of the present disclosure are shown in FIGS. 3 to 5. The double coated tape shown in FIG. 3 is composed of a total of 5 layers, that is, a first adhesive layer 3, a film carrier layer 1, a foam carrier layer 2, a polyurethane film 4 and a second adhesive layer 3', all of which are stacked sequentially. The double coated tape shown in FIG. 4 is composed of a total of 6 layers, that is, a first adhesive layer 3, a film carrier layer 1, a third adhesive layer 3", a foam carrier layer 2, a polyurethane film 4 and a second adhesive layer 3', all of which are stacked sequentially. The double coated tape shown in FIG. 5 is composed of a total of 6 layers, that is, a first adhesive layer 3, a film carrier layer 1, a foam carrier layer 2, a third adhesive layer 3", a polyurethane film 4 and a second adhesive layer 3', all of which are stacked sequentially.

The first adhesive layer 3, the film carrier layer 1, the foam carrier layer 2, the polyurethane film 4, the second adhesive layer 3' and the third adhesive layer 3" may have thicknesses of 10 to 150 micrometers (μm), 10 to 150 μm, 200 to 3,000 μm, 15 to 300 μm, 10 to 150 μm, and 10 to 150 μm, respectively; preferably, of 40 to 120 μm, 20 to 100 μm, 1,000 to 2,500 μm, 15 to 250 μm, 40 to 120 μm, and 40 to 120 μm, respectively; more preferably, of 50 to 100 μm, 30 to 80 μm, 1,200 to 2,000 μm, 20 to 250 μm, 50 to 100 μm, and 50 to 100 μm, respectively.

Hereinafter, the respective layers constituting the double coated tape according to the present disclosure will be described in further detail.

Polyurethane Film

The exemplary polyurethane film 4 of the present disclosure disposed between the foam carrier layer 2 and the second adhesive layer 3' is formed of a soft material, which has relatively high elongation while exhibiting high tensile strength and a low modulus. Due to the presence of the polyurethane film, the double coated tape may be completely peeled from a surface of an object attached to the double coated tape with no residual substance remaining in the object, while maintaining an effect peel adhesion of the foam carrier layer to a bonding surface in order to prevent light leakage when in use. The polyurethane film may be a thermoplastic polyurethane (TPU) film.

Since a polyurethane film is bonded through melting by applying heat, the polyurethane film may be subjected to processes such as extrusion, vacuum molding, heat adhesion and high-frequency processing. Also, the polyurethane film may be melted by applying heat and recycled.

Film Carrier Layer

A sheet formed into a film, for example, a plastic material formed into a film, may be used as the film carrier layer 1.

Specific examples of such a plastic material include an acrylic resin, such as polymethyl methacrylate (PMMA); a polyester, such as polyethylene terephthalate (PET); a polycarbonate; a norbornene-based resin; an olefin polymer; and triacetyl cellulose (TAC). The plastic materials may be used alone or in combination. In some embodiments of the present disclosure, the film carrier 1 is preferably selected from at least one of a a PET film having high transparency, a black opaque film carrier layer, or a combination thereof.

Foam Carrier Layer

The foam carrier layer 2 is a porous sheet obtained by foaming a source resin, which serves to endow the double coated tape with excellent impact resistance and prevent light leakage when in use. The foam carrier layer 2 may be selected from at least one of a foam, such as polystyrene, polyurethane, polyvinyl chloride, acrylates, olefins, rubbers, and blends of these materials.

The raw materials may be used alone or in combination. In the present disclosure, the foam carrier 2 is preferably a polyurethane foam carrier layer.

First, Second, and Third Adhesive Layers

The first, second, and third adhesive layers 3, 3' and 3" may be formed of a pressure-sensitive adhesive (PSA) component, and the components of the first, second, and third adhesive layers 3, 3', and 3" may be identical to or different from each other.

Specific examples of such a PSA component may include acrylic, silicone-based, polyester-based, rubber-based and polyurethane-based polymers. The PSA components may be used alone or in combination. In some embodiments of the present disclosure, any one, number or all of the first, second, and third adhesive layers 3, 3' and 3" adhesive layers may preferably comprise an acrylic polymer having high transparency.

The acrylic polymer is a polymer prepared by copolymerizing a (meth)acrylic acid alkyl ester having 1 to 18 carbon atoms, that is, a $C_{1-18}$ acrylate-based compound, as a main monomer component. Preferably, an acrylic polymer having a weight average molecular weight of 1,000,000 or more may be used herein. As used herein, the term "(meth)acrylate" refers to both acrylate and (meth)acrylate polymers.

Specific examples of the $C_{1-18}$ acrylate-based compound may include methyl(meth)acrylate, ethyl(meth)acrylate, propyl(meth)acrylate, n-butyl(meth)acrylate, isobutyl(meth)acrylate, 2-ethylhexyl(meth)acrylate, n-octyl(meth)acrylate, isooctyl(meth)acrylate, lauryl(meth)acrylate, stearyl(meth)acrylate, isononyl(meth)acrylate, cyclohexyl(meth)acrylate, benzyl(meth)acrylate, methoxyethyl(meth)acrylate, ethoxyethyl(meth)acrylate, and phenoxyethyl(meth)acrylate. A copolymer of the above-described acrylate-based compound and another monomer (e.g, a styrene-based monomer, an olefinic monomer, a vinyl ester, a cyano-group-containing monomer, an amide-group-containing monomer, a hydroxyl-group-containing monomer, an acidic-group-containing monomer, an epoxy-group-containing monomer, an amino-group-containing monomer, a carboxyl-group-containing monomer, etc.) may be used herein.

In some embodiments of the present disclosure, each of the first and second adhesive layers 3 and 3' used herein may have a glass transition temperature of −20 to 20° C. In some embodiments, the third adhesive layer 3" may on its own or in combination with the first and second adhesive layers 3 and 3', have a glass transition temperature of −20 to 20° C.

In some embodiments, each of the respective layers constituting the double coated tape according to the present disclosure may further include various additives, as necessary. Additives such as dyes, pigments and fillers may be added without exerting an adverse effect on the presently disclosed double coated tapes. In particular, carbon black or a black pigment may be included in the layers constituting the presently disclosed double coated tape so as to exhibit light absorption efficiency.

Presently disclosed double coated tapes may be manufactured using conventional methods. For example, the double coated tape may be prepared by (a) (a-1) separately forming a film carrier layer, a foam carrier layer, and a polyurethane film, and then sequentially stacking them; (a-2) simultaneously forming a three-layered stack of a film carrier layer, a foam carrier layer, and a polyurethane film through co-extrusion; or (a-3) forming a foam carrier layer on a film carrier layer by coating and then forming a polyurethane film on the foam carrier layer by coating, and (b) followed by formation of first and second adhesive layers on the film carrier layer and on the polyurethane film, respectively. The double coated tape thus obtained has a structure as shown in FIG. 3.

In another method, the double coated tape may be prepared by (i) forming a polyurethane film on a liner and then forming a foam carrier layer on the polyurethane film to prepare a stack, (ii) forming first and third adhesive layers on both sides of a film carrier layer, respectively, yielding a double coated tape, (iii) combining the stack prepared in step (i) and the double coated tape prepared in step (ii) such that the foam carrier layer of the stack is bonded to the third adhesive layer of the double coated tape to form a laminate, and (iv) removing the liner from the laminate formed in step (iii) and then forming a second adhesive layer on the polyurethane film of the resulting laminate. The double coated tape thus obtained has a structure as shown in FIG. 4.

Alternatively, the double coated tape may be prepared by (1) forming a foam carrier layer on a film carrier layer, and forming first and third adhesive layers on the film carrier layer and the foam carrier layer, respectively, yielding a double coated tape, (2) forming a polyurethane film on a liner and forming a second adhesive layer on the polyurethane film to form a stack, and (3) removing the liner from the stack formed in step (2), and combining the resulting stack and the double coated tape prepared in step (1) such that the polyurethane film of the resulting stack is bonded to the third adhesive layer of the double coated tape. The double coated tape thus obtained has a structure as shown in FIG. 5.

Each of the first, second, and third adhesive layers 3, 3', and 3", respectively, may be formed by directly coating an adhesive composition on the associated layer and curing the composition; or by coating an adhesive composition on a liner and curing the composition, followed by laminating the cured layer on the associated layer.

In some embodiments according to the present disclosure, the double coated tape may further include an additional layer without exerting an adverse effect on the effects of the presently disclosed double coated tape.

In the double coated tape according to the present disclosure, the polyurethane film may have an elongation of 100 to 1,500%, a modulus of 0.1 to 10 MPa, and a breaking load of 0.3 to 3 kgf; preferably, an elongation of 200 to 1,000%, a modulus of 0.2 to 7 MPa, and a breaking load of 0.4 to 2.5 kgf; more preferably, an elongation of 300 to 900%, a modulus of 0.3 to 5 MPa, and a breaking load of 0.5 to 2.0 kgf.

When an LCD panel is attached to a guide frame using the double coated tape manufactured thus, the first adhesive layer may come in contact with the guide frame, and the second adhesive layer may come in contact with the LCD panel. The double coated adhesive tape has excellent reworkability since the second adhesive layer may be easily peeled by forces exerted in a vertical direction, an oblique direction, and a horizontal direction with respect to an adhesive surface of the double coated tape.

As described above, the double coated tape according to the present disclosure can provide improved reworkability to expensive LCD panels as well as effectively prevent light leakage by minimizing stress applied to an LCD since the double coated tape is easily peeled from a surface of an object it is attached to. Therefore, the double coated tape according to the present disclosure can be useful in attaching an LCD panel during manufacture of electronic products such as televisions, mobile phones, and computers.

Hereinafter, the present invention will be described in further detail with reference to the following Examples. However, it should be understood that the description proposed herein is merely a preferable example for the purpose of illustration only, and not intended to limit the scope of the invention.

Example 1

A polyurethane composition (GMC-150SSRB from Gminnotek Co., Ltd. (Hwaseong-si, Korea)) for forming a foam carrier layer 2 was coated on a polyester film carrier layer 1 (polyethylene terephthalate film, SB00 from SKC Co., Ltd. (Cheonan-si, Korea)) having a thickness of 50 µm using a knife coater to form a polyurethane foam carrier layer 2 with a thickness of 1,500 µm thereon. The polyurethane composition for the foam carrier layer 2 had been prepared by polymerization of methylene diisocyanate (30 wt %) and a mixture (60 wt %) of ethylene glycol and diethylene glycol in the presence of additives (10 wt %) consisting of a toner, a catalyst and a surfactant. A polyurethane composition (GM-20 from Gminnotek Co., Ltd. (Hwaseong-si, Korea)) for forming a thermoplastic polyurethane (TPU) film 4 was coated on the foam carrier layer 2 using a knife coater, which was then cured in an oven at a temperature of 130° C. at a curing speed of 4 m/min to form a TPU film 4 with a thickness of 20 µm thereon. The polyurethane composition for the TPU film had been prepared by polymerization of methylene diisocyanate (30 wt %) and a mixture (60 wt %) of polyester-polyol, polypropylene glycol and polyteremethylene glycol in the presence of additives (10 wt %) consisting of a toner, a catalyst and a surfactant.

An adhesive (monomer (isooctyl acrylate:acrylic acid: methyl acrylate=57.5:35:7.5 (wt %)), initiator (solution of 1,1'-isophthaloylbis(2-methylaziridine) in toluene and benzene), 25 wt % solids in ethyl acetate with a weight-average molecular weight (Mw) of approximately 813,000 and a number-average molecular weight (Mn) of approximately 8,200) was coated on a process liner (polyethylene terephthalate film, FILM BYNA 75E-8811DG3/BD from Fujimori Sangyo Co., Ltd. (Tokyo, Japan)) to form an adhesive layer with a thickness of 80 μm thereon, which was wound into a jumbo roll. The oven temperature was 90° C., and the coating speed was 6 m/min.

The adhesive layer was separated from the jumbo roll and was laminated on the film carrier layer 1 and the TPU film 4 as first and second adhesive layers 3, 3', respectively, under the lamination condition of room temperature, a pressure of 6 kgf, and a speed of 12 m/min, to thereby obtain a double coated tape as shown in FIG. 3.

Example 2

A double coated tape was manufactured in the same manner as in Example 1, except that a TPU film 4 having a thickness of 250 μm was formed.

Example 3

Step (3-1)

A polyurethane composition (GM-20 from Gminnotek Co., Ltd. (Hwaseong-si, Korea)) for forming a TPU film 4 was coated on a process liner (polyethylene terephthalate film, SB00 from SKC Co., Ltd. (Cheonan-si, Korea)) having a thickness of 50 μm using a knife coater, which was the cured in an oven at a temperature of 130° C. at a curing speed of 4 m/min to form a TPU film 4 with a thickness of 20 μm thereon. A polyurethane composition (GMC-150SSRB from Gminnotek Co., Ltd. (Hwaseong-si, Korea)) for forming a foam carrier layer 2 was coated on the TPU film 4 using a knife coater to form a polyurethane foam carrier layer 2 with a thickness of 1,500 μm, to thereby form a stack.

Step (3-2)

An adhesive (monomer (isooctyl acrylate:acrylic acid: methyl acrylate=57.5:35:7.5 (wt %)), initiator (solution of 1,1'-isophthaloylbis(2-methylaziridine) in toluene and benzene), 25 wt % solids in ethyl acetate with a weight-average molecular weight (Mw) of approximately 813,000 and a number-average molecular weight (Mn) of approximately 8,200 was coated on a process liner (polyethylene terephthalate film, FILM BYNA 75E-8811DG3/BD from Fujimori Sangyo Co., Ltd. (Tokyo, Japan)) to form an adhesive layer with a thickness of 80 μm thereon, which was wound into a jumbo roll. The oven temperature was 90° C., and the coating speed was 6 m/min.

The adhesive layer was separated from the jumbo roll and was laminated on both sides of a polyester film carrier layer 1 (polyethylene terephthalate film, SB00 from SKC Co., Ltd. (Cheonan-si, Korea)) having a thickness of 50 μm as first and third adhesive layers 3, 3", respectively, under the lamination condition of room temperature, a pressure of 6 kgf, and a speed of 12 m/min, to thereby produce a double coated tape.

Step (3-3)

The double coated tape prepared in step (3-2) was laminated on the stack prepared in step (3-1) such that the foam carrier layer 2 of the stack was bonded to the third adhesive layer 3" of the double coated tape under the lamination condition of room temperature, a pressure of 6 kgf, and a speed of 12 m/min, to thereby form a laminate.

Step (3-4)

The liner was peeled off from TPU film 4 of the laminate formed in step (3-3). The adhesive layer was separated from the jumbo roll prepared in step (3-2) and was laminated on the TPU film 4 of the resulting laminate as a second adhesive layer 3' under the lamination condition of room temperature, a pressure of 6 kgf, and a speed of 12 m/min, to thereby form a double coated tape as shown in FIG. 4.

Example 4

Step (4-1)

A polyurethane composition (GMC-150SSRB from Gminnotek Co., Ltd. (Hwaseong-si, Korea)) for forming a foam carrier layer 2 was coated on a polyester film carrier layer 1 (polyethylene terephthalate film, SB00 from SKC Co., Ltd. (Cheonan-si, Korea)) having a thickness of 50 μm using a knife coater to form a polyurethane foam carrier layer 2 with a thickness of 1,500 μm.

An adhesive (monomer (isooctyl acrylate:acrylic acid: methyl acrylate=57.5:35:7.5 (wt %)), initiator (solution of 1,1'-isophthaloylbis(2-methylaziridine) in toluene and benzene), 25 wt % solids in ethyl acetate with a weight-average molecular weight (Mw) of approximately 813,000 and a number-average molecular weight (Mn) of approximately 8,200) was coated on a process liner (polyethylene terephthalate film, FILM BYNA 75E-8811DG3/BD from Fujimori Sangyo Co., Ltd. (Tokyo, Japan)) to form an adhesive layer with a thickness of 80 μm, which was wound into a jumbo roll. The oven temperature was 90° C., and the coating speed was 6 m/min.

The adhesive layer was separated from the jumbo roll and was laminated on the film carrier layer 1 and the foam carrier layer 2 as first and third adhesive layers 3, 3", respectively, thereby producing a double coated tape.

Step (4-2)

A polyurethane composition (GM-20 from Gminnotek Co., Ltd. (Hwaseong-si, Korea)) for forming a TPU film 4 was coated on a process liner having a thickness of 50 μm (polyethylene terephthalate film, SB00 from SKC Co., Ltd.) using a knife coater, which was then cured in an oven at a temperature of 130° C. at a curing speed of 4 m/min to form a TPU film 4 with a thickness of 20 μm thereon.

The adhesive layer was separated from the jumbo roll prepared in step (4-1) and was laminated on the TPU film 4 as a second adhesive layer 3' under the lamination condition of room temperature, a pressure of 6 kgf, and a speed of 12 m/min, to thereby form a stack.

Step (4-3)

The liner was peeled off from TPU film 4 of the stack formed in step (4-2). Then, the resulting stack was laminated on the double coated tape prepared in step (4-1) such that the TPU film 4 of the stack was bonded to the third adhesive layer 3" of the double coated tape under the lamination condition of room temperature, a pressure of 6 kgf, and a speed of 12 m/min, to thereby form a double coated tape as shown in FIG. 5.

Comparative Example 1

A double coated tape was manufactured in the same manner as in Example 1, except that a polyethylene terephthalate (PET) film (SB00 from SKC Co., Ltd. (Cheonan-si, Korea)) having a thickness of 25 μm was used instead of the polyurethane (TPU) film having a thickness of 20 μm.

Comparative Example 2

A double coated tape was manufactured in the same manner as in Comparative Example 1, except that a PET film having a thickness of 50 μm was used.

The double coated tapes manufactured in Examples 1 to 4 and Comparative Examples 1 and 2 were measured for physical properties, and evaluated for performance, as follows. The results are listed in the following Table 1.

(1) Elongation (%)

The films of the exemplified double coated tapes were measured for elongation (%) according to the ASTM D882 method.

(2) Modulus (MPa)

The films of the exemplified double coated tapes were measured for modulus (MPa) according to the ASTM D882 method.

(3) Breaking Load (kgf)

The films of the exemplified double coated tapes were measured for breaking load (kgf) according to the ASTM D882 method.

(4) Light Leakage Prevention Performance

In a conventional process of manufacturing a television, desired televisions were manufactured by performing an adhesion process using the double coated tape so that the first adhesive layer of the double coated tape came in contact with the guide frame and the second adhesive layer came in contact with the LCD panel, as shown in FIG. 1. In this case, the double coated tape had no case top because a bezel of the television was very thin, and thus was applied between the LCD panel and the guide frame to couple the LCD panel and the guide frame. Then, the light leakage prevention performance was observed and evaluated on a monitor screen of the manufactured television with the naked eye: ○: Good, Δ: Average, and x: Poor.

(5) Reworkability

The first and second adhesive layers of the double coated tape were attached in the same manner as in (4) measurement of the light leakage prevention performance so that the first adhesive layer came in contact with the guide frame and the second adhesive layer came in contact with the LCD panel, and detached again.

After the detachment, a degree of residual adhesive remaining on a surface of the LCD panel were observed and evaluated with the naked eye: ○: Good, Δ: Average, and x: Poor.

disclosure and having the TPU film formed between the layers exhibited softer physical properties such as high elongation, low modulus and low breaking load, compared with those of the double coated tapes of Comparative Examples 1 and 2, which used the PET film in place of the TPU film. As a result, it was confirmed that the double coated tapes prepared according to the present disclosure were able to effectively prevent light leakage by minimizing the stress applied to the LCD, and provide improved reworkability to the expensive LCD panels as well.

What is claimed is:

1. A double coated tape comprising a first adhesive layer, a film carrier layer, a foam carrier layer and a second adhesive layer that are sequentially stacked, wherein the double coated tape includes a polyurethane film disposed between the foam carrier layer and the second adhesive layer, wherein the polyurethane film is a thermoplastic polyurethane (TPU) film; and wherein the polyurethane film has an elongation of 100 to 1500%, a modulus of 0.1 to 10 MPa and a breaking load of 0.3 to 3 kgf.

2. The double coated tape of claim 1 wherein the first adhesive layer, the film carrier layer, the foam carrier layer, the polyurethane film and the second adhesive layer have thicknesses of 10 to 150 μm, 10 to 150 μm, 200 to 3,000 μm, to 300 μm and 10 to 150 μm, respectively.

3. The double coated tape of claim 1 wherein the film carrier layer is a polyethylene terephthalate (PET) carrier layer.

4. The double coated tape of claim 1 wherein the foam carrier layer is a polyurethane foam carrier layer.

5. The double coated tape of claim 1 further comprising a third adhesive layer between the film carrier layer and the foam carrier layer.

6. The double coated tape of claim 1 further comprising a third adhesive layer between the foam carrier layer and the polyurethane film.

7. The double coated tape of claim 5 wherein the first, second and third adhesive layers are adhesive layers composed of an acrylic polymer.

8. The double coated tape of claim 1 wherein the second adhesive layer is formed of a pressure-sensitive adhesive (PSA) component.

9. The double coated tape of claim 1 wherein the polyurethane film has an elongation of 200 to 1,000%, a modulus of 0.2 to 7 MPa, and a breaking load of 0.4 to 2.5 kgf.

10. The double coated tape of claim 1 wherein the polyurethane film has an elongation of 300 to 900%, a modulus of 0.3 to 5 MPa, and a breaking load of 0.5 to 2.0 kgf.

TABLE 1

|  | Example (TPU) | | | | Comparative Example (PET) | |
| --- | --- | --- | --- | --- | --- | --- |
|  | 1 | 2 | 3 | 4 | 1 | 2 |
| Thickness (μm) of film 4 | 20 | 250 | 20 | 20 | 25 | 50 |
| Elongation (%) | 390 | 828 | 285 | 393 | 71 | 63 |
| Modulus (MPa) | 0.3107 | 3.7090 | 0.245 | 4.328 | 4760 | 1058 |
| Breaking load (kgf) | 0.5086 | 1.7221 | 0.4272 | 1.812 | 4.0256 | 7.6088 |
| Light leakage prevention performance | ○ | ○ | ○ | ○ | X | Δ |
| Reworkability | ○ | ○ | ○ | ○ | X | X |

As listed in Table 1, it could be seen that the double coated tapes prepared in Examples 1 to 4 according to the present 11. An electronic product comprising the double coated tape defined in claim 1.

12. The electronic product of claim 11 wherein the electronic product is a television, a mobile phone or a computer.

\* \* \* \* \*

UNITED STATES PATENT AND TRADEMARK OFFICE
CERTIFICATE OF CORRECTION

PATENT NO. : 10,640,684 B2
APPLICATION NO. : 15/036959
DATED : May 5, 2020
INVENTOR(S) : Hayoung Lee

Page 1 of 1

It is certified that error appears in the above-identified patent and that said Letters Patent is hereby corrected as shown below:

In the Claims

<u>Column 10</u>
Line 26, In Claim 2, before "to 300 μm" insert -- 15 --.

Signed and Sealed this
Eighteenth Day of August, 2020

Andrei Iancu
*Director of the United States Patent and Trademark Office*